United States Patent [19]
Hoshi

[11] Patent Number: 5,825,539
[45] Date of Patent: Oct. 20, 1998

[54] MULTI-EYE TYPE IMAGE DISPLAY APPARATUS

[75] Inventor: Hiroaki Hoshi, Yokohama, Japan

[73] Assignee: Canon Kabushiki Kaisha, Tokyo, Japan

[21] Appl. No.: 434,178

[22] Filed: May 3, 1995

[30] Foreign Application Priority Data

May 10, 1994 [JP] Japan ................................. 6-120488
Apr. 27, 1995 [JP] Japan ................................. 7-127162

[51] Int. Cl.$^6$ .......................... G20B 27/22; H04N 13/04; G09G 5/02
[52] U.S. Cl. ............................ 359/462; 359/464; 348/52; 345/9
[58] Field of Search .......................... 359/462, 464, 359/472, 470, 630, 634, 637; 348/51, 52, 53; 349/11, 15; 345/7, 8, 9

[56] References Cited

U.S. PATENT DOCUMENTS 5,343,313  8/1994  Ferguson ..................... 349/11
5,473,365  12/1995  Okamura ..................... 359/462
5,612,709  3/1997  Sudo et al. ..................... 359/462

Primary Examiner—Jon W. Henry
Assistant Examiner—Audrey Chang
Attorney, Agent, or Firm—Morgan & Finnegan LLP

[57] ABSTRACT

A multi-eye type image display apparatus comprises a right-eye image displaying device for emitting light to display an image for the right eye, a left-eye image displaying device for emitting light to display an image for the left eye, an optical device for guiding a light beam from the right-eye image displaying device to the pupil of the right eye of an observer and guiding a light beam from the left-eye image displaying device to the pupil of the left eye of the observer, so that the observer can fuse virtual images of the images with each other, and an adjusting device for adjusting a characteristic of each virtual image in a region including a boundary where the virtual image for the right eye and the virtual image for the left eye overlap.

15 Claims, 13 Drawing Sheets

IMAGE FOR LEFT EYE

IMAGE FOR RIGHT EYE

VIRTUAL IMAGE TO BE OBSERVED (3D DISPLAY)

IMAGE FOR LEFT EYE  IMAGE FOR RIGHT EYE

VIRTUAL IMAGE TO BE OBSERVED

MULTI-EYE TYPE IMAGE DISPLAY APPARATUS

BACKGROUND OF THE INVENTION

1. Field of the Invention

The present invention relates to a multi-eye type image display apparatus, and more particularly to a multi-eye type image display apparatus which is to be mounted and fixed on the head of an observer and which has a mechanism for enlarging display images displayed on compact display elements such as liquid crystal display elements or CRTs to display a panorama image or a stereoscopic image as a virtual image for the observer.

2. Related Background Art

There are conventionally proposed multi-eye image display apparatus for displaying a stereoscopic image or an image wide in the direction of horizontal angle of view, which is a so-called panorama image. Among them, proposals are increasing these years on a goggle type head mounted display (hereinafter referred to as HMD) to be mounted on the head, because they can indicate a large screen display as a virtual image as enlarging images displayed on compact liquid crystal displays (hereinafter referred to as LCDs) through an optical system of a lens etc.

For example, Japanese Patent Application No. 5-92113 proposes a multi-eye image display apparatus which is arranged to make changing means change a relative position between virtual display images as produced by HMD and based on left-eye and right-eye displaying means, whereby it can display a stereoscopic image (hereinafter referred to as a 3D image), a two-dimensional large angle-of-view image (hereinafter referred to as a panorama 2D image) obtained by coupling the virtual display images for the left and right eyes in the horizontal direction, or a 2D–3D mixed image, that is, which can change the aspect ratio of the virtual display image. In this proposal, a combiner element is used to enable the observer to simultaneously observe a superimposed image of display images on LCDs and an external view.

In the above proposal, a change of the aspect ratio of virtual display image was realized by changing a cross angle between optical axes of image-forming optical systems for the left and right eyes or by horizontally shifting the LCDs while fixing the image-forming optical systems, so as to change an overlap degree of left and right virtual images.

In the above proposal, for displaying a panorama 2D image or 2D–3D mixed image by changing the aspect ratio, virtual images for the left and right eyes are horizontally shifted to overlap. Because of this arrangement, one edge of either virtual image (the left edge for the right-eye virtual image or the right edge for the left-eye virtual image) exists in the counterpart virtual image.

In case of the panorama 2D image, a boundary between the left and right virtual images exists near the center of image, which is highest in gaze frequency; in case of the 2D–3D mixed image, a boundary exists between a 2D image and a 3D image. There were cases to cause feelings of something extraneous or confused in the field, if there was disturbance of image or detrimental reflected light from a portion forming an aperture of LCD panel near the boundary.

On the other hand, in case of the 3D display apparatus using real images, as described in Japanese Patent Publication No. 4-43478, a distance to a display position of twin images of left and right real images is theoretically different from a distance to a position where the observer recognizes a fused 3D image through fusion of the images. Thus, left and right image frames are simultaneously observed, particularly near the left and right edges of screen. Therefore, it has a drawback that the doubled image frames are seen when observed as fusing the images; conversely, doubled images are seen when observed as fusing the image frames.

Accordingly, with the 3D display apparatus using real images as disclosed in Japanese Patent Publication No. 4-43478, it is almost impossible to achieve the function to change the aspect ratio as described in Japanese Patent Application No. 5-92113, because of the drawback of an increase in the scale of apparatus and the intrinsic defect that the structure throws the observer off the balance of vergence and accommodation of human eyes because of the above difference between the display position of left and right real images and the distance of the position for recognizing the fused image.

Further, the 3D display apparatus of Japanese Patent Publication No. 4-43478 employs means for fixedly cutting off information of the edges of left and right screens in order to reduce presence of image frames. Namely, the edges of screens are always subject to shading correction, correction of signal level, correction of hue and saturation, correction of luminance, or correction of resolution, thereby making the screen edges inconspicuous to the image frames. If the correcting means as disclosed in Japanese Patent Publication No. 4-43478 were employed for making inconspicuous the boundaries in the virtual images in Japanese Patent Application No. 5-92113, an always fixed reduction in quantity of information of image, i.e., deterioration of image quality would be inevitable in either case of 2D, 3D, and 2D–3D mixture. This results from the contradiction that the correcting means of Japanese Patent Publication No. 4-43478 is applied to the display apparatus of Japanese Patent Application No. 5-92113 that has solved the above-described problem of the display apparatus of Japanese Patent Publication No. 4-43478.

Further, the correcting means of Japanese Patent Publication No. 4-43478 cannot be a measure for cases with detrimental reflected light from the part forming the aperture of LCD panel near the boundary of virtual image.

SUMMARY OF THE INVENTION

An object of the present invention is to provide a multi-eye type image display apparatus easy in changing the aspect ratio, wherein for displaying a 2D–3D mixed image or a panorama 2D image, brightness or sharpness of a virtual image near a boundary, overlapping with a counterpart virtual image, is gradually decreased, thereby making overlap of images near the boundary look more natural and enabling the observer to appreciate images with little fatigue and for a long time.

A certain form of the multi-eye type image display apparatus of the present invention for achieving the object is characterized by having:

right-eye image displaying means for emitting light to display an image for the right eye;

left-eye image displaying means for emitting light to display an image for the left eye;

optical means for guiding a light beam from the right-eye image displaying means to the pupil of the right eye of an observer and guiding a light beam from the left-eye image displaying means to the pupil of the left eye of the observer, so that the observer can fuse virtual images of the images with each other; and adjusting means for adjusting a characteristic of each virtual image in a region including a boundary where the virtual image for the right eye and the virtual image for the left eye overlap.

A preferred form of the multi-eye type image display apparatus further comprises virtual image moving means for adjusting an overlapping state between the virtual image for the right eye and the virtual image for the left eye.

In a preferred form, the virtual image moving means and the adjusting means operate in synchronization.

A preferred form of the adjusted characteristic of the each virtual image is a light intensity of the each virtual image.

A preferred form of the adjusting means gradually decreases the light intensities in a horizontal direction in a light intensity distribution of a predetermined region including a left edge in regard to the virtual image for the right eye and of a predetermined region including a right edge in regard to the virtual image for the left eye.

A preferred form of the adjusting means has an optical filter provided in each optical path of the optical means.

A preferred form of the optical filter is an ND filter.

A preferred form of the optical filter is an evaporated filter.

A preferred form of the optical filter has a phase plate changing a thickness thereof asymptotically or stepwise, and a polarizing plate.

A preferred form of the adjusting means has means for electrically adjusting the light intensity of a display image of the each displaying means.

A preferred form of the adjusted characteristic of the each virtual image is a spatial frequency characteristic of the each virtual image.

A preferred form of the adjusting means changes the spatial frequency characteristics in a horizontal direction, of a predetermined region including the left edge in regard to the virtual image for the right eye and of a predetermined region including the right edge in regard to the virtual image for the left eye.

A preferred form of the adjusting means has an optical low-pass filter.

A preferred form of the optical low-pass filter is a filter in which image-doubling elements having a function to double an image in the horizontal direction are laminated.

A preferred form of the adjusting means has an electronic frequency filter for electrically adjusting a spatial frequency of a display image of the each displaying means.

The multi-eye type image display apparatus of the present invention will be described with some embodiments as detailed below.

DESCRIPTION OF THE PREFERRED EMBODIMENTS

Figure 1:
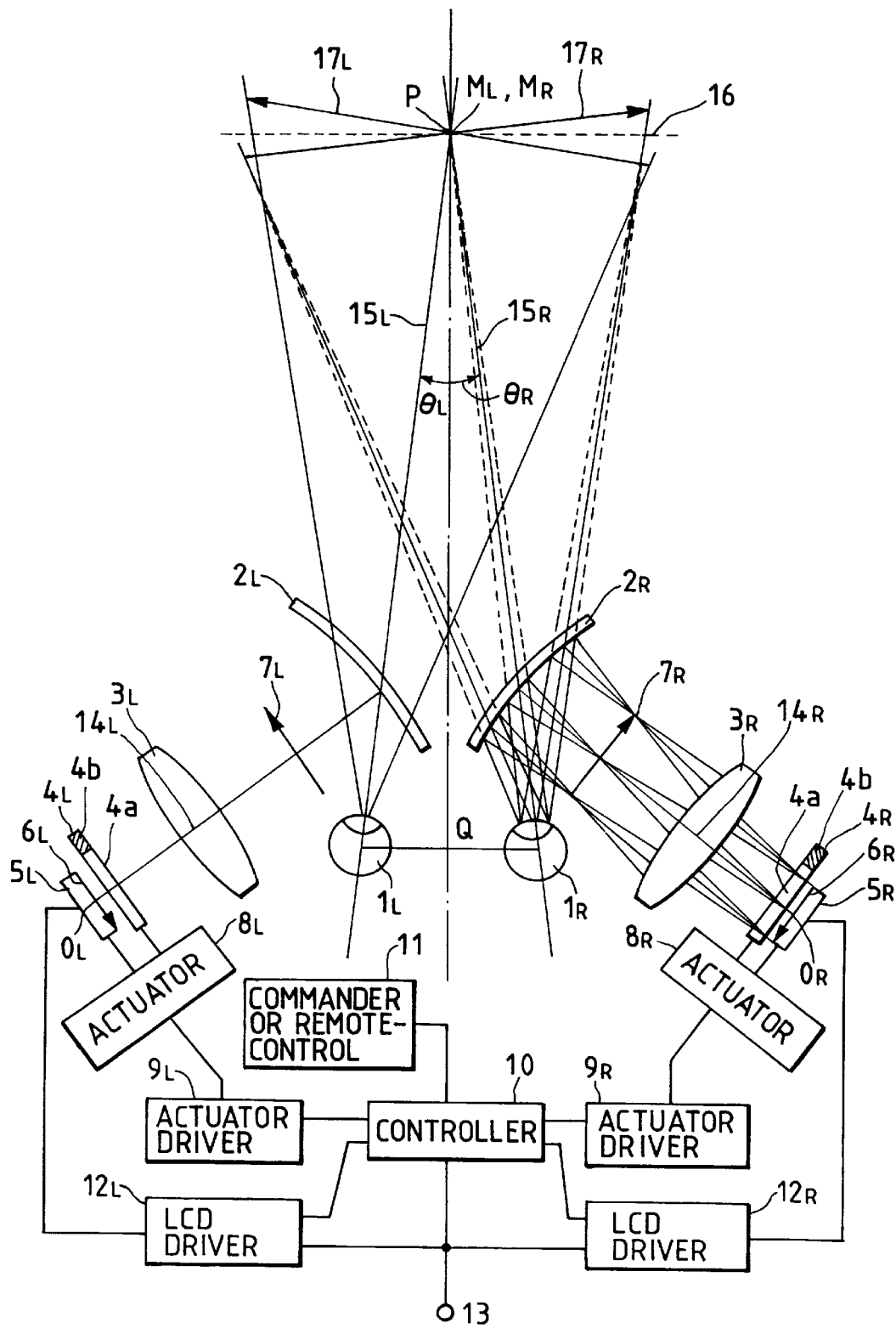
FIG. 1 is a schematic drawing of major part to show a case of 3D image display in Embodiment 1 of the present invention.
Figure 2:
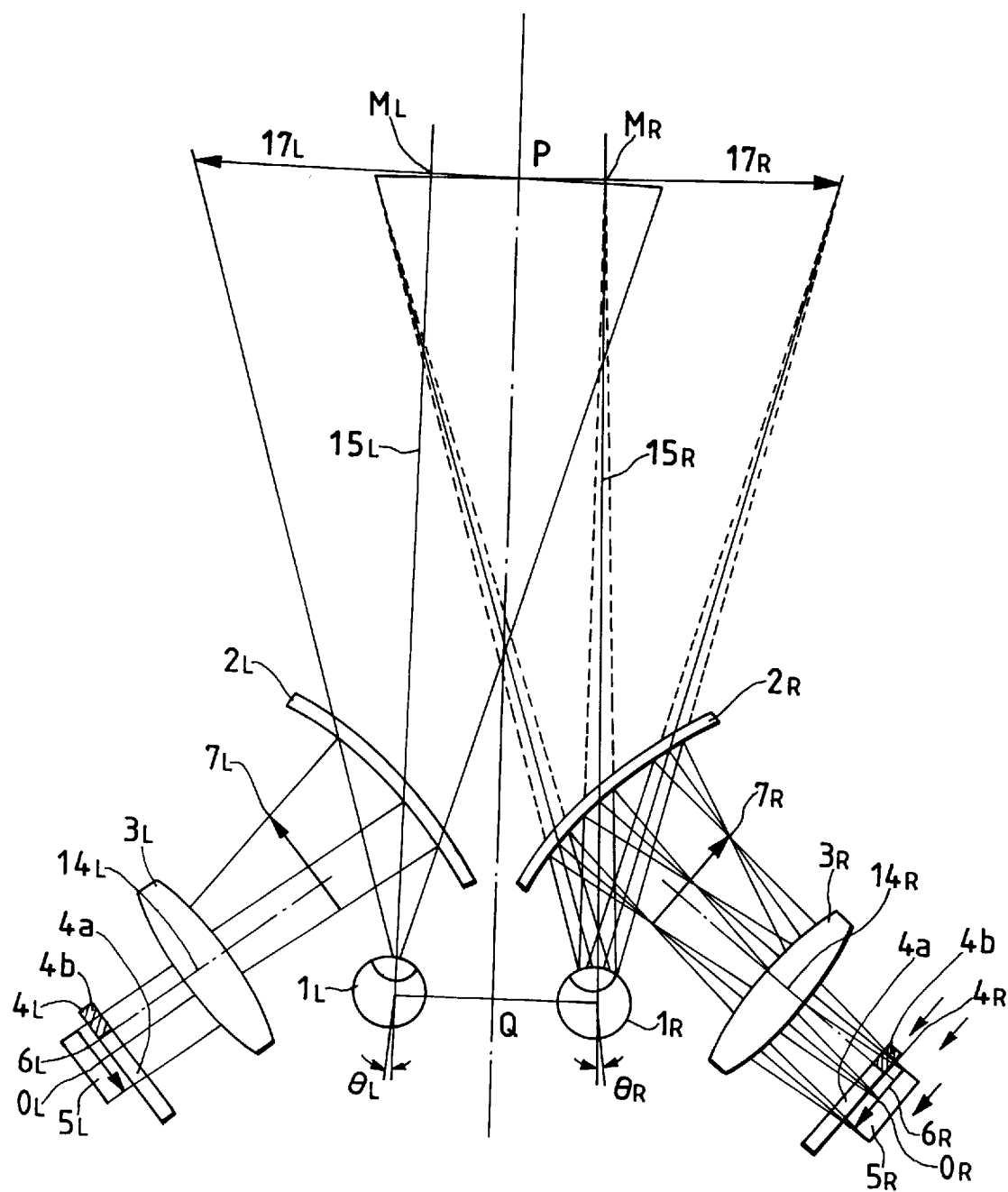
FIG. 2 is a schematic drawing of major part to show a case of 2D–3D mixed image display in Embodiment 1 of the present invention.
Figure 3:
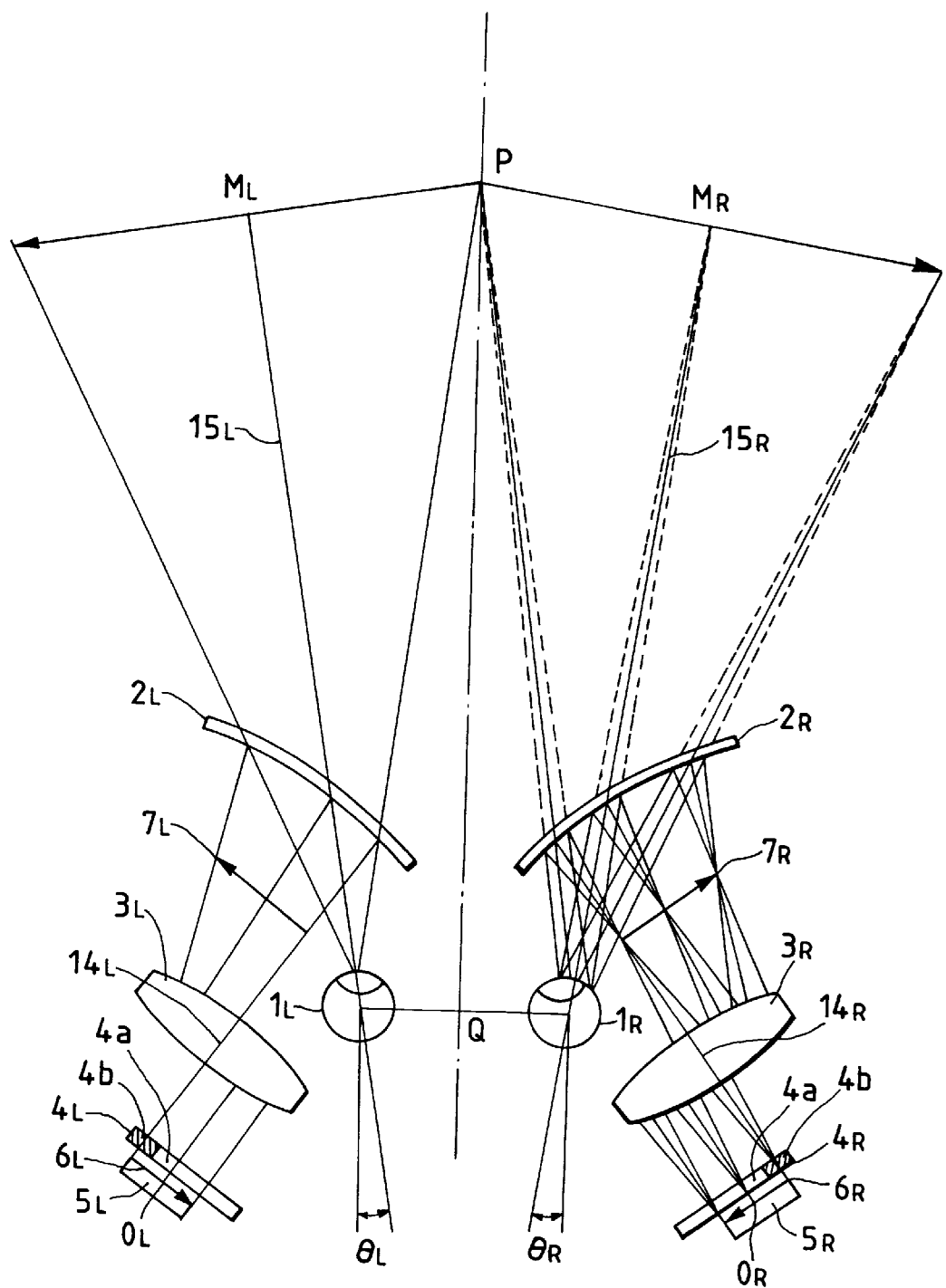
FIG. 3 is a schematic drawing of major part to show a case of panorama 2D image display in Embodiment 1 of the present invention.

FIG. 1 to FIG. 3 are schematic drawings of major part of Embodiment 1 where the present invention is applied to a head mounted display (HMD).

In these drawings, $1_L$ is the left eye of an observer, and $1_R$ the right eye of the observer. Hereinafter, reference numerals with subscripts L, R represent members for the left eye and the right eye, respectively. Further, $2_L$ or $2_R$ designates an eyepiece optical system of a mirror system or half mirror system, $3_L$, $3_R$ a relay optical system, and $4_L$, $4_R$ an optical filter having a transparent portion 4a and a transmittance attenuating region 4b. The eyepiece optical system $2_L$, $2_R$, relay optical system $3_L$, $3_R$, and optical filter $4_L$, $4_R$ constitute an element of an image-forming optical system.

Numeral $5_L$, $5_R$ designates a display means, which is a small liquid crystal panel (hereinafter referred to as LCD) incorporated with a backlight in the present embodiment. Numeral $6_L$, $6_R$ denotes a display image on LCD $5_L$, $5_R$, numeral $7_L$, $7_R$ an intermediate image primarily formed from the display image $6_L$, $6_R$ by the relay optical system $3_L$, $3_R$, numeral $8_L$, $8_R$ an actuator for moving the LCD 5 and optical filter 4, numeral $9_L$, $9_R$ an actuator driver, numeral 10 a controller of HMD, numeral 11 a commander or remote controller, numeral $12_L$, $12_R$ an LCD driver (including a backlight driver), numeral 13 an input terminal of external signal, numeral $14_L$, $14_R$ the optical axis of relay optical system $3_L$, $3_R$, numeral 16 a virtual image plane, numeral $17_L$, $17_R$ a virtual image of the primarily formed intermediate image $7_L$, $7_R$ by the eyepiece optical system $2_L$, $2_R$, letter $M_L$, $M_R$ a virtual-image center of the virtual image $17_L$, $17_R$, numeral $15_L$, $15_R$ a virtual-image center line connecting the virtual-image center $M_L$, $M_R$ with the eyeball $1_L$, $1_R$, letter Q a middle point of a straight line connecting the left and right eyeballs $1_L$, $1_R$, and letter P an intersecting point of the normal line from the point Q to the virtual display plane 16. Further, $\theta_L$, $\theta_R$ is an angle of the virtual-image center line $15_L$, $15_R$ relative to the straight line PQ.

FIG. 1 shows a case in which a normal 3D image is displayed. In the drawing, image information, which is video signals and control information signals attached thereto herein, is input through the external-signal input terminal 13 from an external multi-eye camera, an image memory such as a tape or disk, broadcast, or a network, and the video signals and the control signals are transmitted to the LCD drivers $12_L$, $12_R$ and the controller 10, respectively. Using the control information signals and identification information of left and right images attached to headers of the image information signals out of the input signals, the controller 10 sends a control signal to the LCD driver $12_L$, $12_R$ to make an image processing circuit inside the LCD driver $12_L$, $12_R$ perform necessary processing. Also, the controller 10 sends information about the angle $\theta_L$ $\theta_R$ of the virtual-image center line $15_L$, $15_R$ relative to the PQ line to the actuator driver $9_L$, $9_R$.

The present embodiment is so arranged as to effect a change from 3D image display to 2D-3D mixed image display or panorama 2D image display, i.e., a change of the aspect ratio by horizontally moving the LCDs $5_L$, $5_R$ along the display surfaces thereof. Movement information of LCD 5 sent from the controller 10 to the actuator driver 9L, $9_R$ on this occasion includes an amount of relative left-and-right movement of LCD $5_L$, $5_R$ relative to the optical axis $14_L$, $14_R$ of the relay optical system $3_L$, $3_R$, and an amount of relative left-and-right movement of the optical filter $4_L$, $4_R$ moving in synchronization therewith, as described below.

The actuator driver $9_L$, $9_R$ moves the LCD $5_L$, $5_R$ and optical filter $4_L$, $4_R$ each by a predetermined amount based on the information. Here, the actuator 8, actuator driver 9, and controller 10 constitute an element of the moving means.

FIG. 1 shows a case in which the elements are set for 3D image display, wherein the center $O_L$, $O_R$ of the display surface of LCD $5_L$, $5_R$ is coincident with the optical axis $14_L$, $14_R$ and wherein the transparent portion 4a of the optical filter $4_L$, $4_R$ covers the display screen of LCD $5_L$, $5_R$ with a margin. The intermediate image $7_L$, $7_R$ of the display image $6_L$, $6_R$ is flipped from side to side, and is further reflected by the eyepiece optical system $2_L$, $2_R$ to be guided to the left or right eye $1_L$, $1_R$ of the observer. The virtual images $17_L$, $17_R$ for the left and right eyes are observed as overlapping with each other while the centers thereof $M_L$, $M_R$ are coincident with each other. In this embodiment, because the eyepiece optical system $2_L$, $2_R$ is a half mirror of an aspherical shape, the external view can be observed through the eyepiece optical system $2_L$, $2_R$ at the same time as the virtual image $17_L$, $17_R$ is displayed (which will be called as a seethrough function).

With LCDs using a nematic liquid crystal, an azimuthal distribution of contrast (visual characteristics) is not uniform, and it is thus desired that the relay optical system 3 be telecentric as shown with respect to the display surface of LCD 5.

Since the drawings are diagrammatic, relative relations of sizes are not always drawn accurately. In the present embodiment, an image on LCD $5_L$, $5_R$ of 0.7 inch diagonal is displayed as a virtual image on a large screen of about 30 inches at 1 m ahead.

Figure 4A:
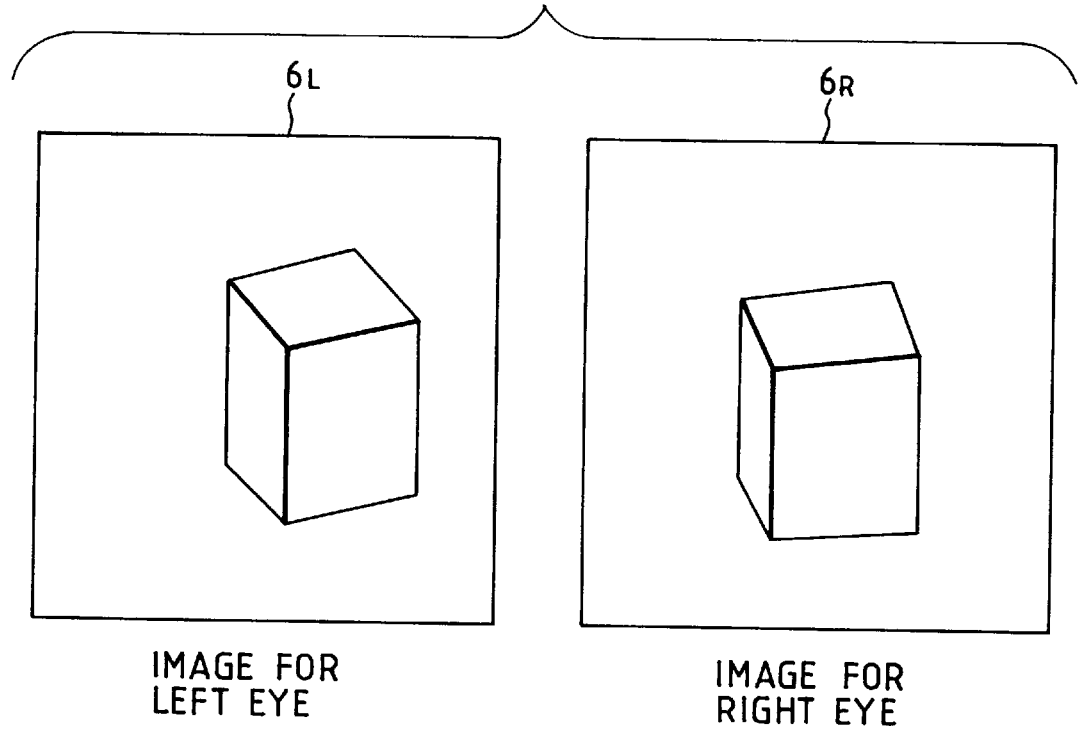
FIG. 4A is an explanatory drawing of 3D image display to show display images for the left and right eyes.
Figure 4B:
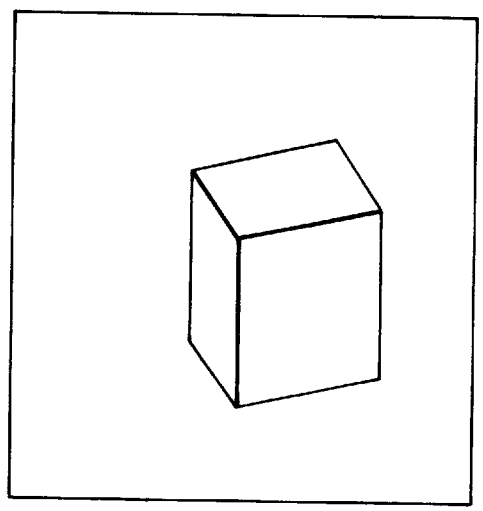
FIG. 4B is an explanatory drawing of 3D image display to show a virtual image observed.

FIGS. 4A and 4B diagrammatically show display images for the left and right eyes (FIG. 4A) and a virtual image observed (FIG. 4B) when Embodiment 1 of the present invention presents 3D image display, which indicate that a stereoscopic image is observed by fusion of virtual images of the display images with binocular parallax.

FIG. 2 is a schematic drawing of major part where a 2D-3D mixed image is displayed in Embodiment 1. From input signals through the external-signal input terminal 13 the controller 10 identifies information about 2D-3D mixed image, overlap rate of left and right display images, aspect ratio, etc., calculates amounts of movement of LCD $5_L$, $5_R$ and optical filter $4_L$, $4_R$ necessary in this case, and then moves the LCD 5 and optical filter 4 through the actuator $8_L$, $8_R$.

Figure 5A:
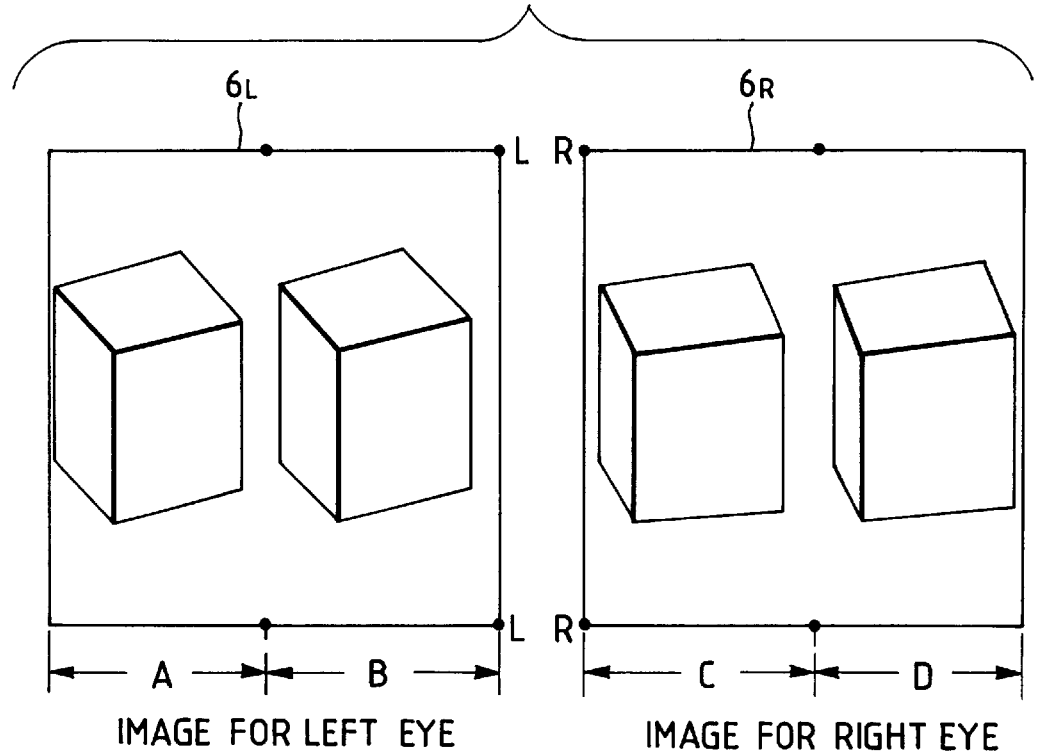
FIG. 5A is an explanatory drawing of 2D–3D mixed image display to show display images for the left and right eyes.
Figure 5B:
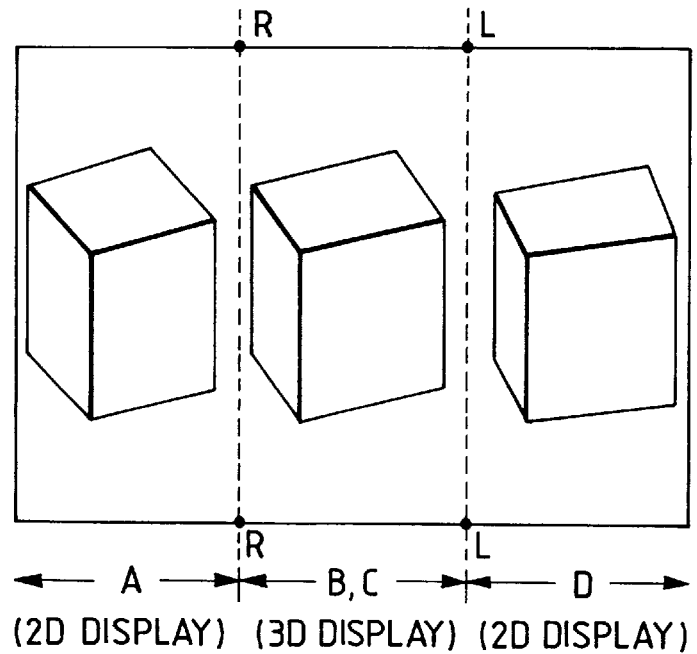
FIG. 5B is an explanatory drawing of 2D–3D mixed image display to show a virtual image observed.

FIGS. 5A and 5B are diagrammatic drawings to show display images for the left and right eyes (FIG. 5A) and a virtual image observed (FIG. 5B) in that case. Among the left and right display images (FIG. 5A), region B and region C overlap with each other, so that 3D image display is effected only in the overlapping regions B, C, but 2D image display in regions A, D without overlap. In this case there are boundaries between the 2D and 3D regions due to the edges of display images. Then the left edge of the display region of LCD $5_L$ is displayed on a line LL in the virtual image of 2D-3D mixed image. Similarly, the right edge of LCD $5_R$ is displayed on a line RR in the virtual image of 2D-3D mixed image.

In order to reduce negative effects of the edges, the present embodiment is arranged in such a manner that a relative position of the optical filter $4_L$, $4_R$ is changed to LCD 5 so that the transmittance attenuating region 4b thereof (the hatched region in FIGS. 1 to 3) may include the edge of display image, thereby preventing the boundary line from being observed clearly.

In case of the 3D image display shown in FIG. 1, the optical axis 14 of the relay optical system 3 is coincident with the center 0 of LCD 5, so that the centers of display image 6, intermediate image 7, and virtual image 17 have on a same optical axis, thus producing no boundary of the two virtual images in this case. Therefore, the optical filter 4 disposed in the vicinity of the display surface of LCD 5 is so set that the transparent portion 4a of the optical filter 4 covers a light beam transmitting region of the display image so as not to affect a light beam from LCD 5.

In case of the 2D-3D image display shown in FIG. 2, LCD 5 is moved in a plane perpendicular to the optical axis 14. Thus, the display image 6 also moves according to it, and the light beam entering the relay optical system 3 also moves.

The intermediate image 7 moves relative to the optical axis 14 in the opposite direction to the display image 6, and the virtual image 17 also moves in the same direction as the image 7. In case of the 2D-3D mixed image display, a problem is the edge of the virtual image 17 in FIG. 2, located in the counterpart virtual image. In this case, the optical filter 4 is moved so that the portion of transmittance attenuating region 4b (hatched portion) of the optical filter 4 includes the edge portion appearing in the display image 6. In other words, the transmittance attenuating region 4b covers the edge to cut disturbance of an image part near the edge and an image due to detrimental reflected light from the portion forming the aperture of LCD 5.

Figure 6A:
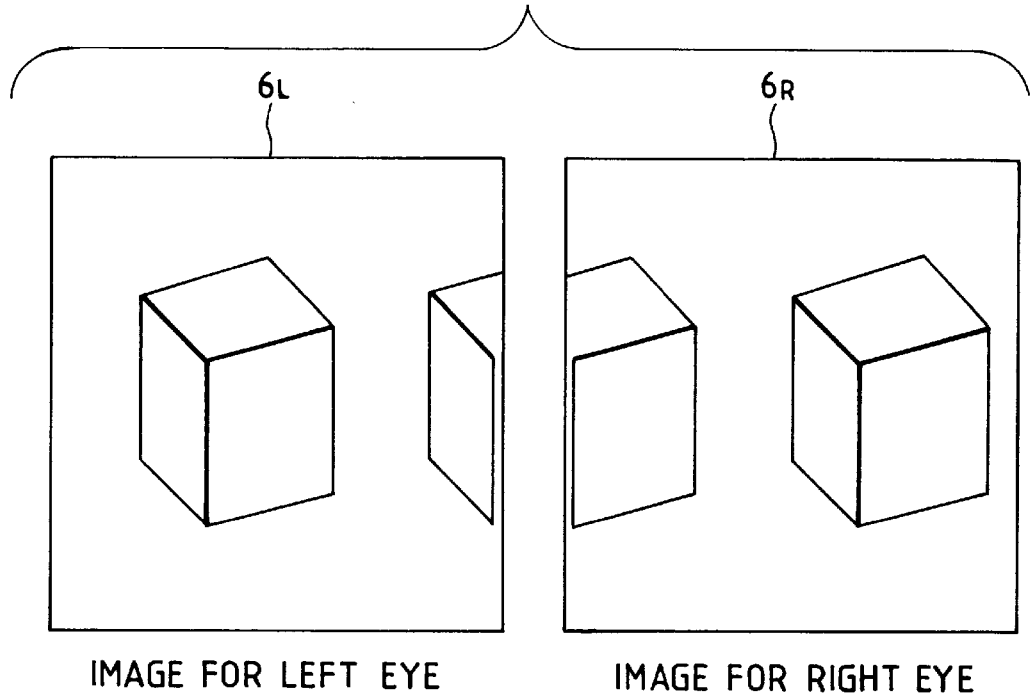
FIG. 6A is an explanatory drawing of panorama 2D image display to show display images for the left and right eyes.
Figure 6B:
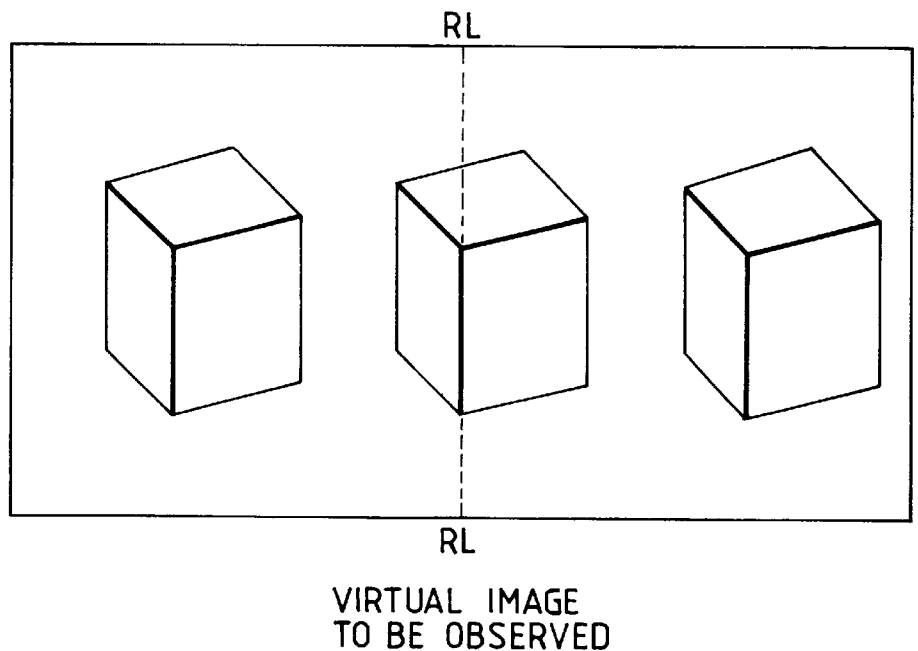
FIG. 6B is an explanatory drawing of panorama 2D image display to show a virtual image observed.

FIG. 3 is a schematic drawing of major part to show a case of panorama 2D image display in Embodiment 1 of the present invention. In this case, the aspect ratio becomes further greater, and overlap of the left and right images is little. FIGS. 6A and 6B are diagrammatic drawings to show display images for the left and right eyes (FIG. 6A) and a virtual image observed (FIG. 6B) in that case. The boundaries LL, RR on which the edges are located are present in the connecting part between the both virtual images. The present embodiment is so arranged that the optical filter 4 is also moved in this case so that the transmittance attenuating region 4b includes the edge LL, RR, thereby eliminating hindrance of the edge.

Figure 7A:
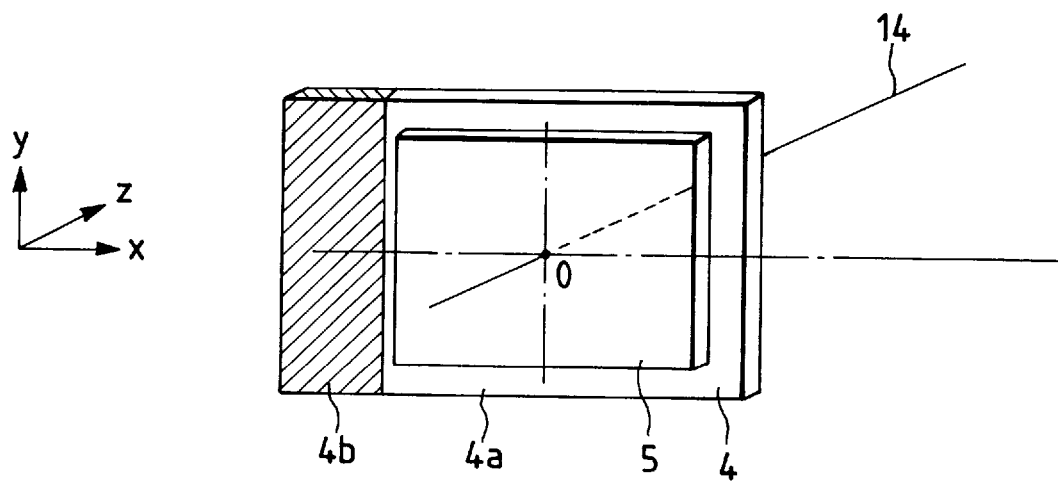
FIG. 7A is a perspective view of a positional relation between an LCD and an optical filter in case of 3D image display.
Figure 7B:
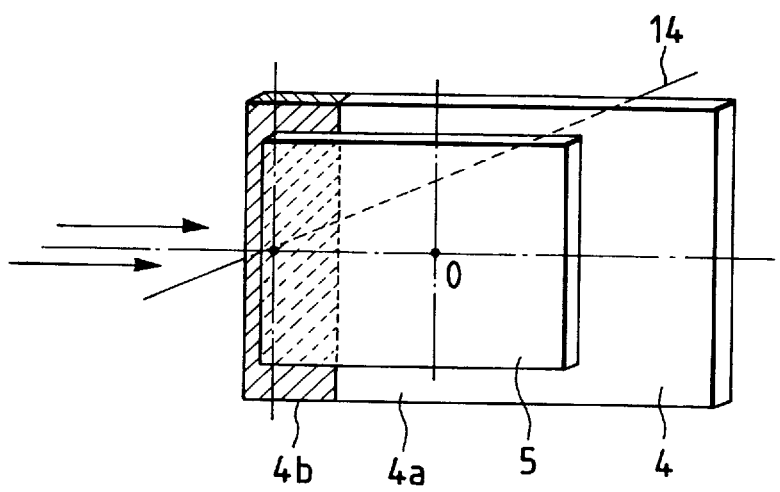
FIG. 7B is a perspective view of a positional relation between an LCD and an optical filter in case of panorama 2D image display.

FIGS. 7A and 7B are perspective views to show the positional relation between the LCD 5 and the optical filter 4. (It is noted herein that in these figures the display surface of LCD 5 is drawn in the same size as LCD 5.) These figures show the relative position of the LCD 5 and the optical filter 4 relative to the optical axis 14 of the relay optical system 3.

FIG. 7A shows the case of 3D image display of FIG. 1, while FIG. 7B the case of panorama 2D image display of FIG. 3. The case of 2D–3D mixed image display is basically the same as the case of panorama 2D image display.

Let us consider a coordinate system defining the z axis along the optical axis 14 and the xy plane as shown in the display surface of LCD 5. In FIG. 7A the optical axis 14 is coincident with the center 0 of the display surface of LCD 5, so that the transparent portion 4a of the optical filter 4 covers the entire display surface of LCD 5. In the case of panorama 2D image display of FIG. 7B, the LCD 5 is moved in the x direction in the xy plane so as to shift the center 0 away from the optical axis 14. Further, the optical filter 4 is moved more in the x direction in the xy plane, so that the amplitude attenuating region 4b of the filter 4 covers the image edge along the y direction on the optical axis 14 side of LCD 5.

Figure 8A:
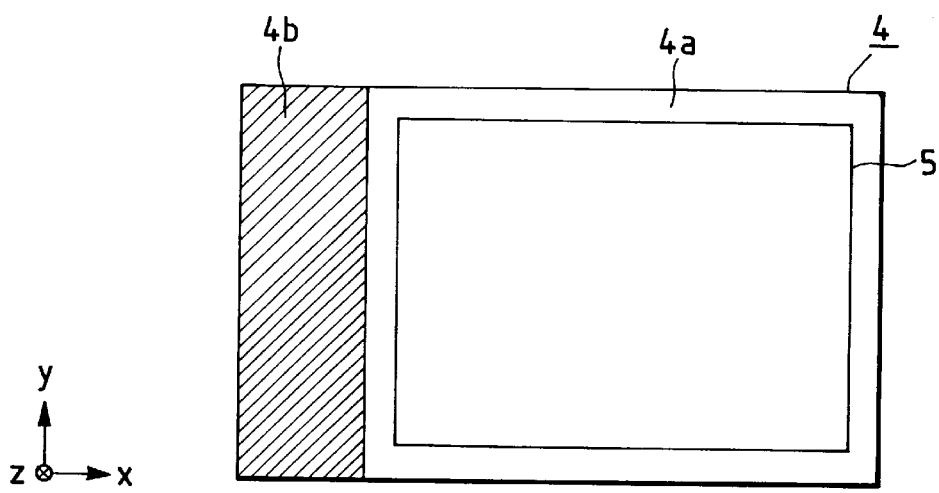
FIG. 8A is a drawing to show a shape of Embodiment 1 of the optical filter according to the present invention.
Figure 8B:
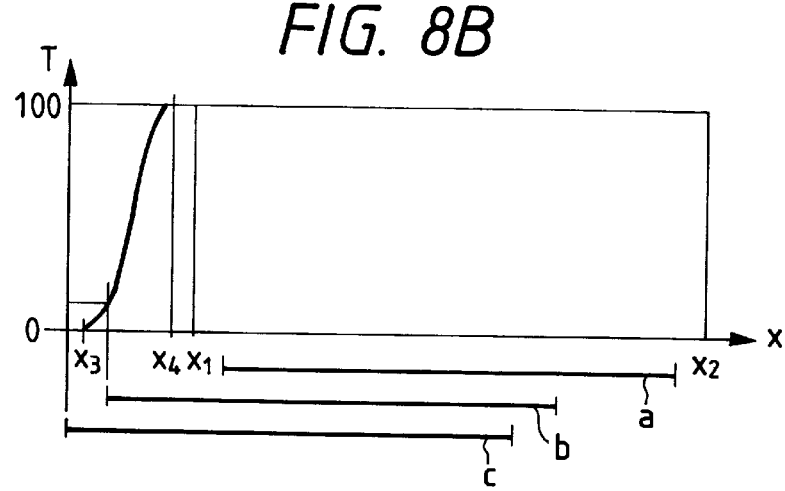
FIG. 8B is a drawing to show the transmittance of Embodiment 1 of the optical filter according to the present invention.

FIGS. 8A and 8B are explanatory drawings of Embodiment 1 of the optical filter 4 according to the present invention. The optical filter 4 is composed of the optically transparent region 4a and the region 4b in which the transmittance attenuates in the horizontal direction (x direction), and the transparent portion 4a has a size enough to fully cover the region transmitting the light beam from the display image 6, on LCD 5.

FIG. 8B is a diagrammatic drawing to show a distribution of transmittances T in the x direction, of the optical filter 4 of the present embodiment. Let us consider herein the coordinate axis x with the origin at the edge of optical filter 4. In the drawing, on the x coordinate axis, T=0% between O and $x_3$; the transmittances change from 0% to 100% between $x_3$ and $x_4$; T=100% from $x_4$ through $x_1$ to $x_2$; and then T=0% over $x_2$. Among them, the range of from x=0 to x=$x_1$ is the transmittance attenuating region 4b. The reason of T=0% in the part of x=0 to $x_3$ and T=100% in the part of x=$x_4$ to $x_1$ is to moderate the tolerance of positioning in the x direction.

In FIG. 8B each straight line a, b, c represents a left-to-right length of the display surface of LCD 5, which indicates the relative position between the LCD 5 and the optical filter 4 in either case. Among them, the line a indicates the position of the display surface of LCD 5 in the case of 3D image display, in which the LCD 5 is perfectly within the portion of transmittance 100%.

The line c indicates the case of 2D–3D mixed image display or panorama 2D image display, in which the left edge of LCD 5 is located at x=0 where the transmittance is 0% in order to erase the edge. If the filter transmittance of the edge part does not have to be T=0% but may be for example about $1/e^2$ for reducing the effects of edge, the line b may be employed for the relative positional relation between the display surface of LCD 5 and the optical filter 4.

In the present embodiment the optical filter 4 having such a transmittance curve is produced for example by vapor deposition of a reflective film of Al or Cr, or by changing the concentration as in an ND filter by absorption.

Figure 9:
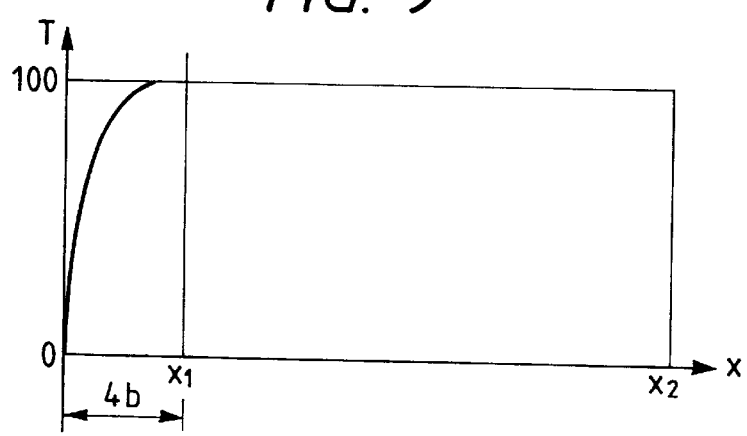
FIG. 9 shows Embodiment 2 of the optical filter according to the present invention.

FIG. 9 is an explanatory drawing of Embodiment 2 of the optical filter 4 according to the present invention. The present embodiment is an example wherein the transmittance curve is logarithmic in the range of $0 \leq x \leq x_1$, by which the tolerance becomes stricter as compared with Embodiment 1 of the optical filter of FIG. 8, but the edge erasing effect becomes more natural on the image.

Figure 10A:
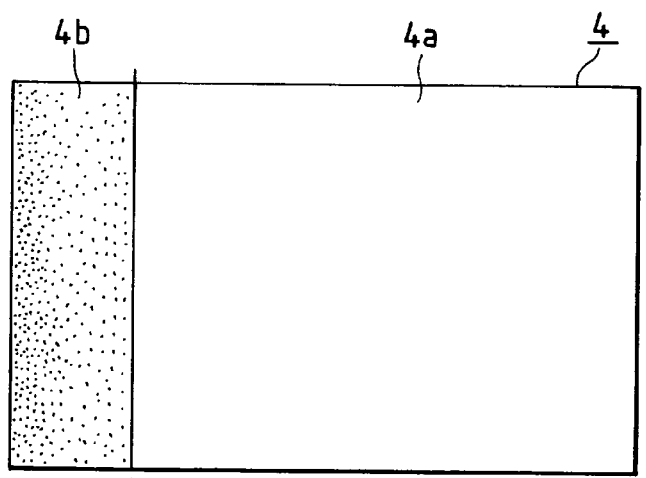
FIG. 10A is a drawing to show a shape of Embodiment 3 of the optical filter according to the present invention.
Figure 10B:
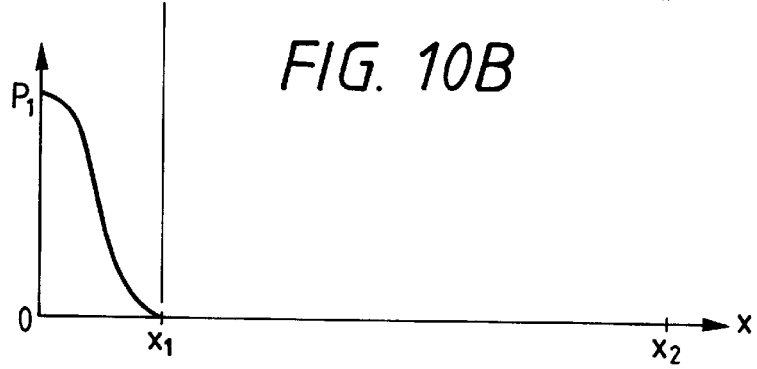
FIG. 10B is a drawing to show a density distribution of micro balls in Embodiment 3 of the optical filter according to the present invention.

FIGS. 10A and 10B are explanatory drawings of Embodiment 3 of the optical filter 4 according to the present invention. The present embodiment does not modulate the light intensity distribution by lowering the transmittance of the optical filter 4, but employs a ground glass diffuser in the 4b part of the optical filter 4 to effect a low-pass filter (hereinafter referred to as LPF) in the spatial frequency region so as to make the spatial frequency characteristics near the edge dull, thereby removing the negative effects of the edge. In the drawing, the region of optical LPF 4b is processed by a method of mechanical roughening with abrasive grains, a method of roughening with chemical etching, a method of depositing micro balls, a method of spraying micro balls at high speed from the tip of nozzle to roughen the surface, etc.

FIG. 10B shows a density distribution p of micro balls when the LPF was formed by deposition of micro balls, in which the effect of LPF becomes maximum at x=0. Although not described particularly using the drawing, the optical LPF may be produced using hologram and diffraction grating, which is easy to control the optical characteristics, thus achieving excellent characteristics.

Figure 11:
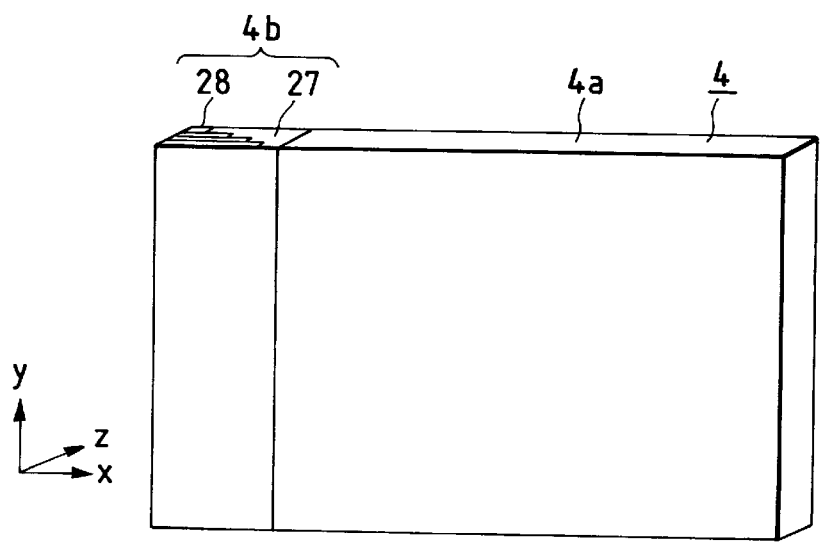
FIG. 11 shows Embodiment 4 of the optical filter according to the present invention.

FIG. 11 is an explanatory drawing of Embodiment 4 of the optical filter 4 according to the present invention. This is also an example of the optical LPF for the 4b part of the optical filter 4, in which the LPF is made by a lamination of double image elements utilizing birefringence. In this example, a double image LPF 28, which is a stepwise lamination of plate elements for doubling images in the x direction utilizing birefringence of quartz, is combined with an optical member 27 index-matched therewith. The lamination of double image elements repeats image doubling in the x direction, thus functioning as LPF only in the x direction.

Figure 12:
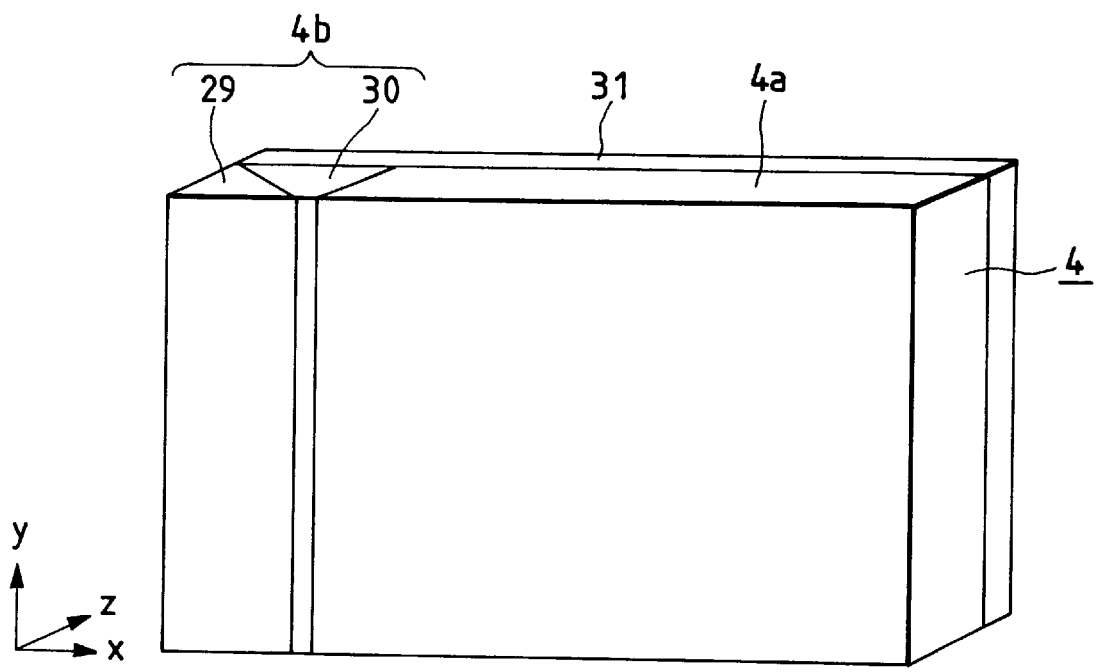
FIG. 12 shows Embodiment 5 of the optical filter according to the present invention.

FIG. 12 is an explanatory drawing of Embodiment 5 of the optical filter 4 according to the present invention. This example is composed of a phase element 29 in which a z-directional thickness of a phase plate utilizing the birefringence of quartz is changed depending upon x coordinate, an optical member 30 index-matched therewith, and a polarizing plate 31 covering the entire surface of optical filter 4. Since a light beam from LCD 5 is linearly polarized, the polarization is changed depending upon the thickness of the phase element 29. The maximum thickness region of phase element 29 is a so-called half wave plate, where the direction of polarization of light is rotated 90°. The axis of the polarizing plate 31 is set in the direction of parallel Nicols to transmit linearly polarized light having passed through the transparent portion 4a as it is. Thus, the linearly polarized light passing through the phase element 29 has a transmittance curve substantially same as in Embodiment 2 shown in FIG. 9 in the x direction after having passed the optical filter 4.

Figure 13:
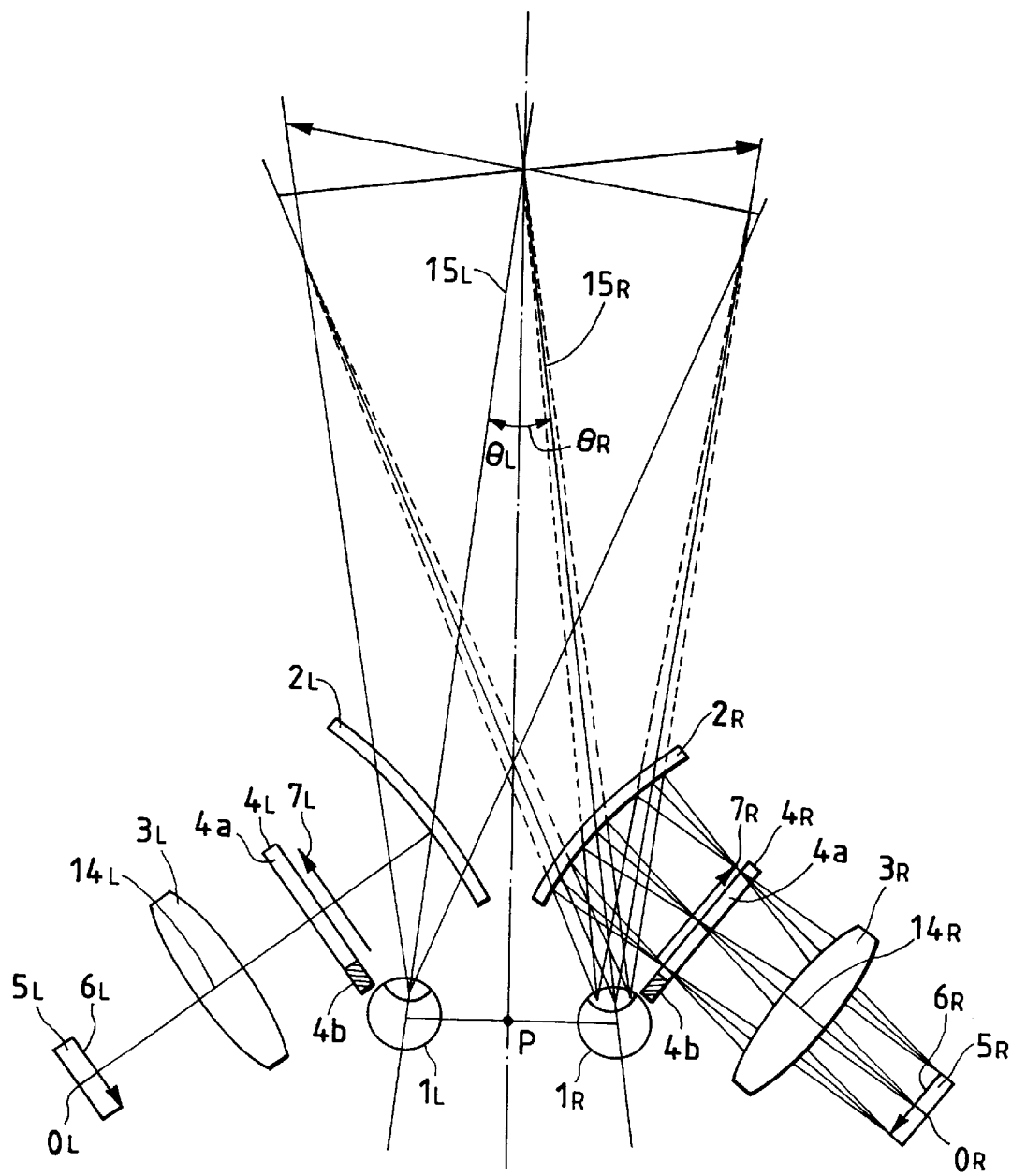
FIG. 13 is a schematic drawing of major part to show a case of 3D image display in Embodiment 2 of the present invention.
Figure 14:
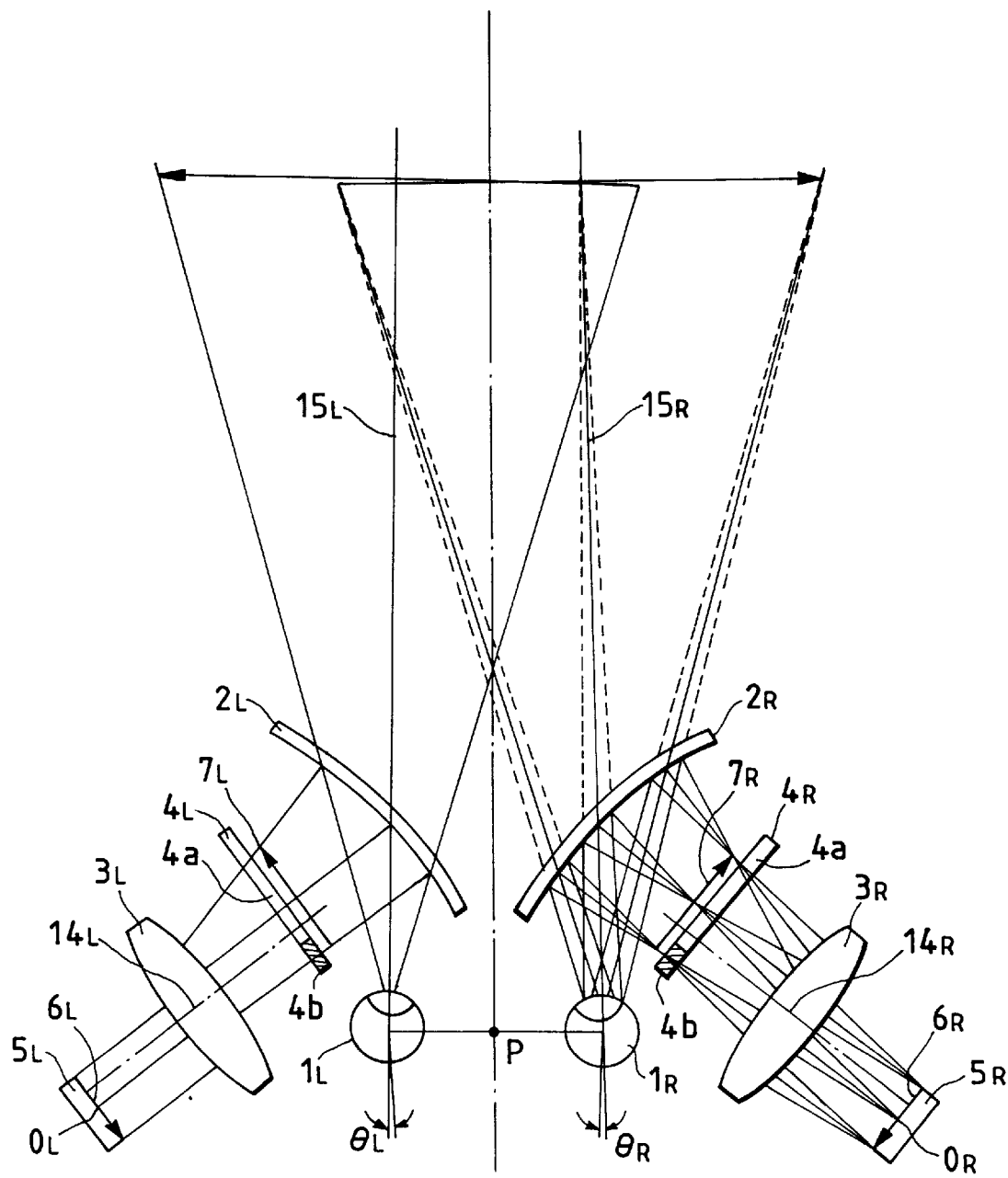
FIG. 14 is a schematic drawing of major part to show a case of 2D–3D mixed image display in Embodiment 2 of the present invention.

FIG. 13 and FIG. 14 are schematic drawings of major part of Embodiment 2 of the present invention. A difference from Embodiment 1 is the location of the optical filter 4. FIG. 13 shows the case of 3D image display, while FIG. 14 the case of 2D–3D mixed image display. Although the drawings show only the optical system, the apparatus also includes the elements for changing the aspect ratio in addition to the optical system as described in Embodiment 1.

The present embodiment is an example in which the optical filter 4 is placed near the intermediate image 7. The optical filter 4 is placed on the relay optical system side with respect to the intermediate image 7 in this embodiment, but the same effect can be attained when the optical filter 4 is placed either on the intermediate image 7 or on the pupil side. In this embodiment, the optical filter 4 is flipped from side to side from that in Embodiment 1, and the size of optical filter 4 increases by an image magnification of the relay optical system 3; but the tolerance of positioning accuracy becomes looser, which facilitates control. The optical filters as described in Embodiment 1 all can be used as the optical filter 4 used in Embodiment 2.

The above embodiments showed the examples of optical processing means for the boundaries between the virtual images. However, the present invention is by no means limited to the optical processing means, but it can be embodied by electrical processing means.

Figure 15:
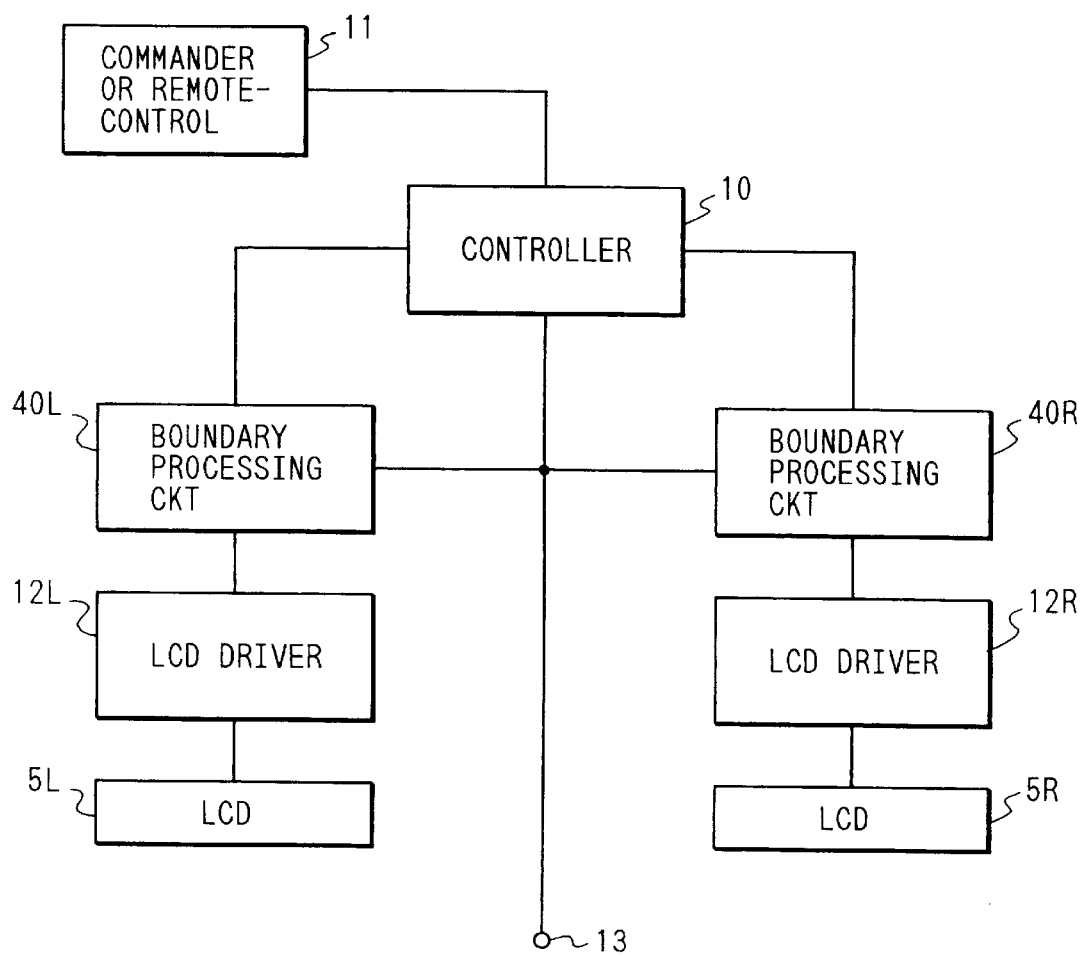
FIG. 15 is a circuit structural drawing of Embodiment 3 of the present invention.

FIG. 15 is a circuit structural drawing of Embodiment 3 of the present invention. In FIG. 15 components with same reference numerals as those in FIG. 1 denote the same components. Further, FIG. 15 shows only the circuit arrangement, but omits illustration of optical components.

In FIG. 15, image information, which is video signals and control information signals herein, is input through the external signal input terminal 13, and a left or right video signal is input through a left or right boundary processing circuit $40_R$, $40_L$ to LCD driver $12_R$, 12L The boundary processing circuit $40_R$, $40_L$, according to a control signal from the controller 10, changes signal processing necessary for an image in the boundary region in correspondence to a change of from 3D image display to 2D–3D mixed image display or panorama 2D image display, and effects the changed signal processing on the video signal.

Namely, similarly as in the case of optical processing means as described previously, the processing is not effected only on the image in the boundary region in the case of 3D image display, because there is no boundary in the left and right virtual images. In the case of 2D–3D mixed image display or panorama 2D image display, the image in the boundary region is processed to reduce the effects of the edge by smoothly dropping the luminance of the edge part appearing in the display image of virtual image similarly as in the embodiments in FIGS. 7A, 7B, FIGS. 8A, 8B, and FIG. 9 by an electronic or electric attenuating filter. Alternatively, in order to lower the spatial frequency characteristics of the image of the edge part similarly as in the embodiments of FIGS. 10A, 10B, FIG. 11, and FIG. 12, the frequency band is limited by electronic or electric LPF so as to reduce the negative effects of edge. The effect is greater when the characteristics of electrical LPF in this case change continuously or stepwise, similarly as in the case of the characteristics of optical LPF as described previously.

The attenuating filter and LPF each can be constructed as an analog circuit or as a digital circuit. Also, the same function can be achieved by software processing effected on once digitalized image signals. Optimum means can be selected for them in view of system.

The change of the aspect ratio was made by movement of LCD in the above description of the embodiments, but the present invention can be similarly applicable to cases for horizontally shifting two virtual images by another means, for example by an variable-angle-prism or by rotating two wedge prisms in mutually opposite directions around the optical axis.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multi-eye type image display apparatus comprising:
   right-eye image displaying means for emitting light to display an image for the right eye;
   left-eye image displaying means for emitting light to display an image for the left eye;
   optical means for guiding a light beam from said right-eye image displaying means to the pupil of the right eye of an observer and guiding a light beam from said left-eye image displaying means to the pupil of the left eye of the observer, so that said observer can fuse virtual images of said images with each other; and
   adjusting means for adjusting a characteristic of each said virtual image in a region including edges of each of the virtual images for the right and left eyes in an overlapping area where said virtual image for the right eye and said virtual image for the left eye overlap.

2. The apparatus according to claim 1, further comprising virtual image moving means for adjusting an overlapping state between said virtual image for the right eye and said virtual image for the left eye.

3. The apparatus according to claim 2, wherein said virtual image moving means and said adjusting means operate in synchronization.

4. The apparatus according to claim 1, wherein said adjusted characteristic of the each virtual image is a light intensity of said each virtual image.

5. A multi-eye type image display apparatus comprising:
   right-eye image displaying means for emitting light to display an image for the right eye;
   left-eye image displaying means for emitting light to display an image for the left eye;
   optical means for guiding a light beam from said right-eye image displaying means to the pupil of the right eye of an observer and guiding a light beam from said left-eye image displaying means to the pupil of the left eye of the observer, so that said observer can fuse virtual images of said images with each other;
   adjusting means for adjusting a characteristic of each said virtual image in a region including edges each of the virtual images for the right and left eyes in an overlapping area where said virtual image for the right eye and said virtual image for the left eye overlap;
   wherein said adjusted characteristic of each virtual image is a light intensity of said each virtual image; and
   wherein said adjusting means gradually decreases the light intensities in a horizontal direction in a light intensity distribution of a predetermined region including a left edge in regard to said virtual image for the right eye and of a predetermined region including a right edge in regard to the virtual image for the left eye.

6. The apparatus according to claim 5, wherein said adjusting means has an optical filter provided in each optical path of said optical means.

7. The apparatus according to claim 6, wherein said optical filter is an ND filter.

8. The apparatus according to claim 7, wherein said adjusting means has means for electrically adjusting the light intensity of a display image of said each displaying means.

9. The apparatus according to claim 6, wherein said optical filter is an evaporated filter.

10. The apparatus according to claim 6, wherein said optical filter has a phase plate changing a thickness thereof asymptotically or stepwise, and a polarizing plate.

11. A multi-eye type image display apparatus comprising:

right-eye image displaying means for emitting light to display an image for the right eye;

left-eye image displaying means for emitting light to display an image for the left eye;

optical means for guiding a light beam from said right-eye image displaying means to the pupil of the right eye of an observer and guiding a light beam from said left-eye image displaying means to the pupil of the left eye of the observer, so that said observer can fuse virtual images of said images with each other;

adjusting means for adjusting a characteristic of each said virtual image in a region including edges of each of the virtual images for the right and left eyes in an overlapping area where said virtual image for the right eye and said virtual image for the left eye overlap; and wherein said adjusted characteristic of each virtual image is a spatial frequency characteristic of said each virtual image.

12. The apparatus according to claim 11, wherein said adjusting means changes the spatial frequency characteristics in a horizontal direction, of a predetermined region including the left edge in regard to said virtual image for the right eye and of a predetermined region including the right edge in regard to the virtual image for the left eye.

13. The apparatus according to claim 12, wherein said adjusting means has an optical low-pass filter.

14. The apparatus according to claim 13, wherein said optical low-pass filter is a filter in which image-doubling elements having a function to double an image in the horizontal direction are laminated.

15. The apparatus according to claim 12, wherein said adjusting means has an electronic frequency filter for electrically adjusting a spatial frequency of a display image of said each displaying means.

* * * * *

UNITED STATES PATENT AND TRADEMARK OFFICE
CERTIFICATE OF CORRECTION

PATENT NO. : 5,825,539

DATED : October 20, 1998

INVENTOR(S) : Hiroaki Hoshi

It is certified that error appears in the above-identified patent and that said Letters Patent is hereby corrected as shown below:

Column 5, line 24, please delete "$\theta_L \theta_R$" and insert therefor -- $\theta_L, \theta_R$ --.

Column 8, line 15, please delete "$0 \leqq x \leqq x_1$" and insert therefor -- $0 \leq x \leq x_1$ --, Signed and Sealed this Second Day of February, 1999

Attest:

*Attesting Officer*

*Acting Commissioner of Patents and Trademarks*